United States Patent [19]

Bordon

[11] Patent Number: 5,480,280
[45] Date of Patent: Jan. 2, 1996

[54] METHOD AND APPARATUS FOR DISPENSING PALLETS

[75] Inventor: Emil L. Bordon, Denver, Colo.

[73] Assignee: Conveying Industries, Inc., Denver, Colo.

[21] Appl. No.: 327,435

[22] Filed: Oct. 21, 1994

[51] Int. Cl.⁶ .................................................. B65G 59/06
[52] U.S. Cl. .................. 414/798.1; 221/292; 414/795.6; 414/786
[58] Field of Search ................................ 414/795.6, 798, 414/798.1, 933, 786; 221/292, 293

[56]         References Cited

U.S. PATENT DOCUMENTS

| | | |
|---|---|---|
| 3,757,971 | 9/1973 | Frish . |
| 3,780,884 | 12/1973 | Jones . |
| 3,865,258 | 2/1975 | Müller . |
| 4,607,476 | 8/1986 | Fulton, Jr. ............................... 53/399 |
| 4,702,660 | 10/1987 | Niehaus et al. ........................ 414/95 |
| 4,809,881 | 3/1989 | Becker ................................. 414/795.64 |
| 4,865,515 | 9/1989 | Dorner et al. ........................... 414/788.2 |
| 4,960,362 | 10/1990 | Karpisek .............................. 414/797.4 |
| 4,971,514 | 11/1990 | Hunter .................................. 414/795.3 |
| 5,096,367 | 3/1992 | Winski ..................................... 414/786 |
| 5,120,178 | 6/1992 | Ito ........................................... 414/225 |

FOREIGN PATENT DOCUMENTS

| | | | |
|---|---|---|---|
| 1-275332 | 11/1989 | Japan | ............................. 414/795.6 |

Primary Examiner—Michael S. Huppert
Assistant Examiner—Janice L. Krizek
Attorney, Agent, or Firm—John E. Reilly

[57]         ABSTRACT

Apparatus for dispensing pallets from a stack supported in a downstacker frame is made up of a pair of laterally spaced conveyor belts extending beneath the frame, a lift mechanism which can be lifted and lowered between the conveyor belts both for supporting the stack of pallets and for individually lowering a pallet onto the conveyor belt, and a pallet control mechanism for selectively separating each lower pallet from the stack so that it can be deposited on the conveyor belts.

18 Claims, 3 Drawing Sheets

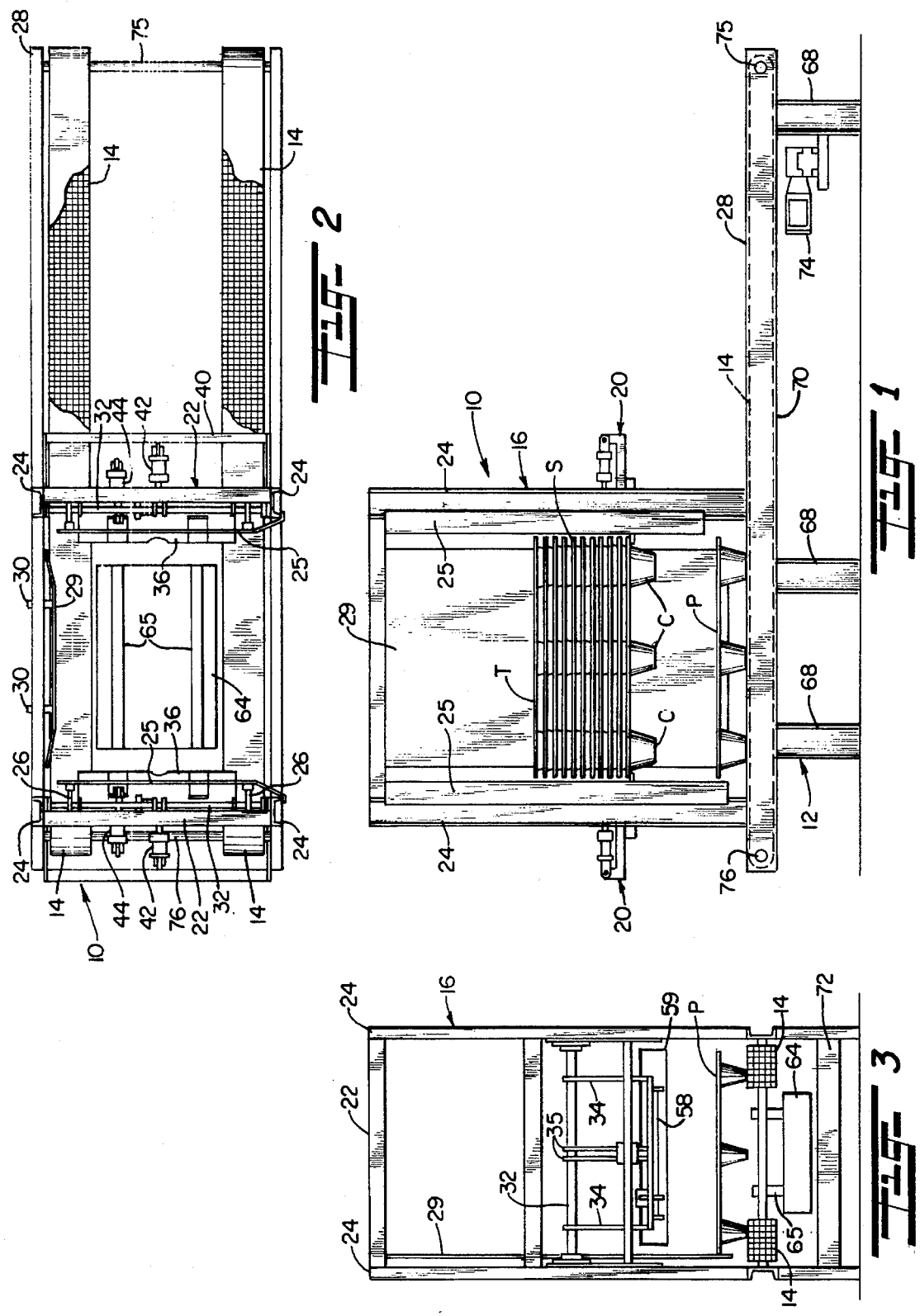

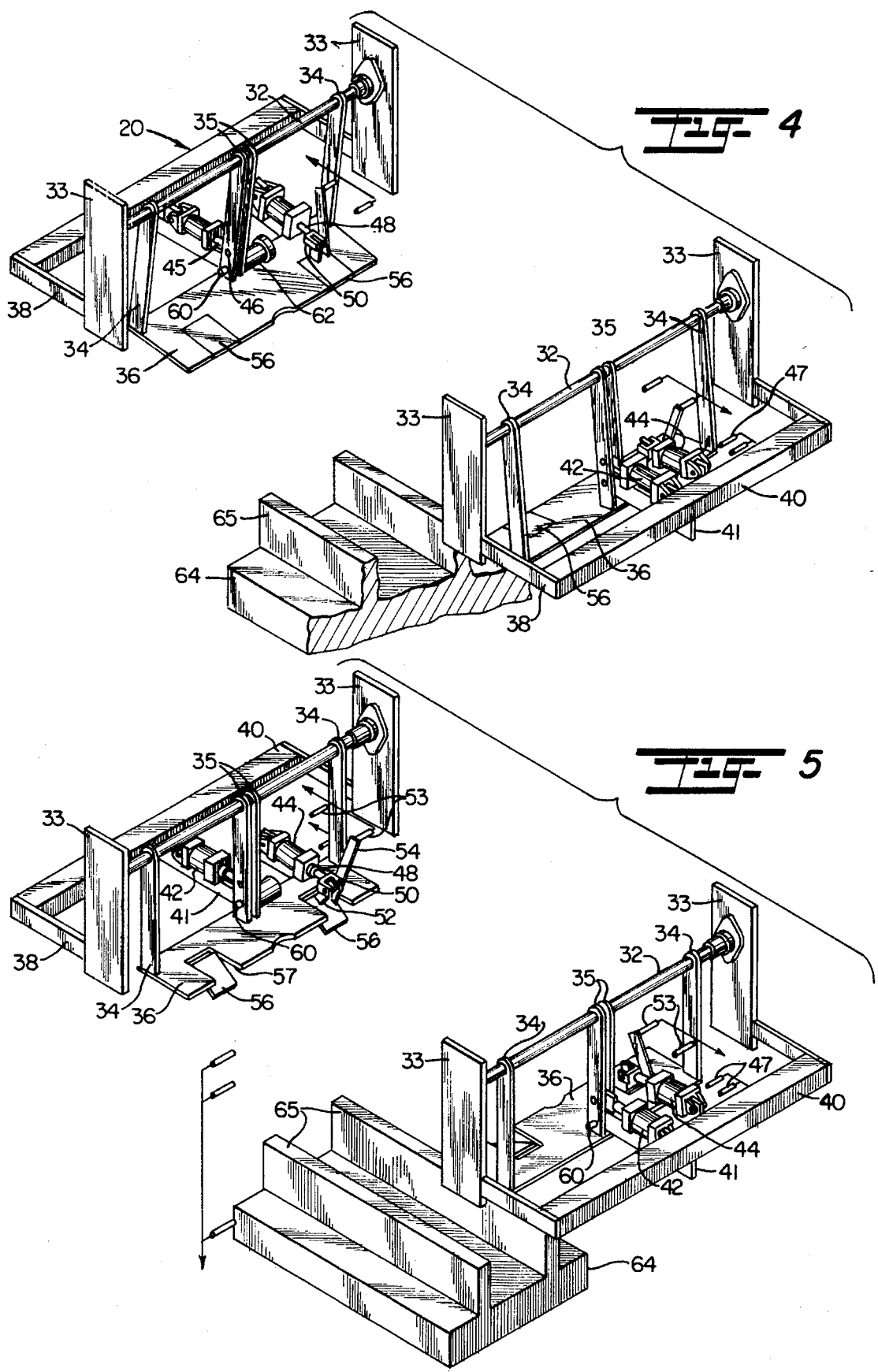

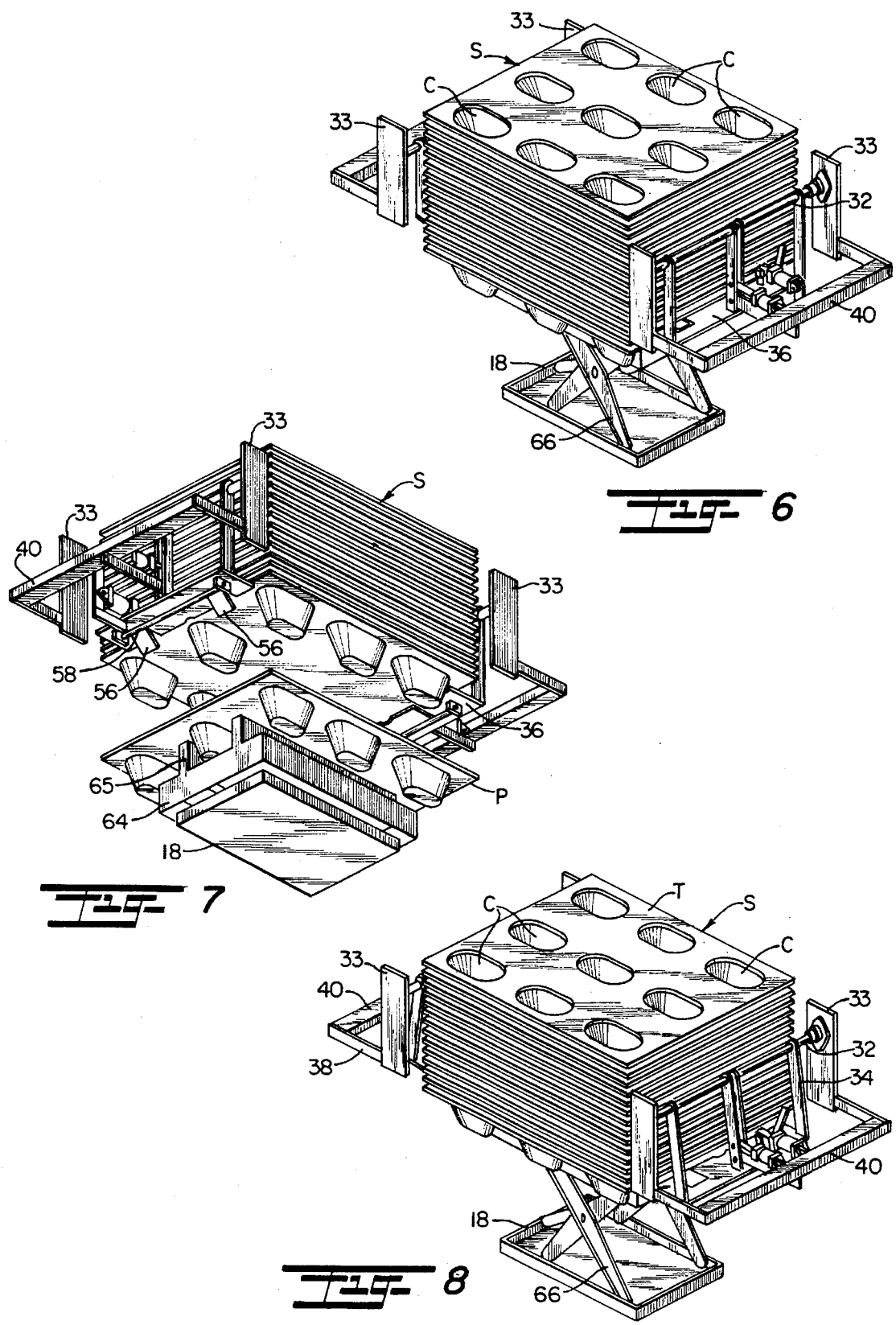

METHOD AND APPARATUS FOR DISPENSING PALLETS

BACKGROUND AND FIELD OF INVENTION

This invention relates to material handling systems; and more particularly relates to a novel and improved method and apparatus for stacking, unstacking and transferring pallets and pallet-like articles which are nestable together and require separation and individual transfer from a stack to another location.

Pallets are in widespread use in handling and conveying materials and customarily involve arranging the pallets in a stack, individually removing each pallet from the stack and transferring to another location where the pallet is loaded with one or more articles. Subsequently, in a depalletizing operation, the pallets are unloaded and restacked to repeat the foregoing operation and sequence. In the past, relatively sophisticated apparatus has been required to separate each pallet from the stack and advance laterally away from the stack to deposit or place on a conveyor. For example, reference is made to U.S. Pat. Nos. 3,780,884 to R. K. Jones, 4,702,660 to G. Niehaus et al and 4,960,362, to L. S. Karpisek.

Traditionally, the standard pallets in use have been flat wooden trays or platforms and which could be easily separated from a stack but were not nestable together. Accordingly, the standard pallets described are gradually being replaced by molded, preformed plastic or pressed wood pallets generally in the form of an egg carton which can be nested together and can withstand increased loading. However, a problem confronting users of the preformed pallet is to effect positive separation of each individual pallet from the stack, since the nestable pallets tend to become wedged together particularly when subjected to the weight of an entire stack.

It is proposed to simplify and accelerate the pallet dispensing operation and in such a way as to permit utilization of a portable lift in direct association with a conveyor extending beneath a stack of pallets thereby minimizing the distance and direction of movement of each pallet away from the stack and eliminating parts and components formerly required in the dispensing operation. It is further proposed to effect positive separation of nestable pallets from one another as a part of a closely coordinated sequence of steps in removing each pallet from the stack and transferring to another location.

Other representative patents in the field are U.S. Pat. Nos. 4,757,971 to W. G. Frish, 3,865,258 to G. Muller, 4,607,476 to C. B. Fulton, Jr., 4,865,515 to W. C. Dorner et al, 4,971,514 to D. F. Hunter, 4,096,367 to E. P. Sinski and 5,120,178 to M. Ito.

SUMMARY OF INVENTION

It is therefore an object of the present invention to provide for a novel and improved method and apparatus for transferring pallets or other articles in a material handling operation.

It is another object of the present invention to provide for a novel and improved method and apparatus for stacking, unstacking and transferring pallets in a minimum number of steps and in a reliable and efficient manner.

It is a further object of the present invention to provide for a novel and improved method and apparatus for handling stacks of nestable pallets, and specifically wherein each pallet is positively separated from a lower end of the stack while supporting the entire weight of the remaining stack of pallets.

It is a still further object of the present invention to provide for a novel and improved apparatus for dispensing individual pallets from a stack in a closely coordinated sequence of steps and in such a way that each pallet can be transferred in a single direction away from the stack to another location for further handling.

An additional object of the present invention is to provide for a novel and improved method and apparatus for dispensing pallets individually from a stack of pallets onto a conveyor run extending immediately beneath the stack of pallets so as to minimize the steps and distance required for transferring each pallet; and further wherein a portable scissors lift may be utilized to lower individual pallets from the stack onto the conveyor runs.

In accordance with the present invention, apparatus is provided for dispensing pallets from a downstacker frame in which laterally spaced conveyor belt runs extend beneath the frame, drive means are provided for selectively driving the conveyor belt runs in a common direction, and pallet control means associated with the frame individually dispense a lowermost of each pallet in the stack onto the conveyor belt runs. Lift means is interposed between the conveyor belt runs for lifting and lowering the stack of pallets with respect to the downstacker frame and to cooperate with the pallet control means in dispensing each lowermost pallet in succession from the stack onto the conveyor belt runs. The pallet control means is characterized by having support plates on opposite sides of the frame which are pivotally mounted for movement into and out of engagement with the stack of pallets above the lowermost pallet in the stack, and pivotal fingers on the support plates are engageable with the lowermost pallet to displace it from the stack when the stack is supported by the support plates.

In the method for dispensing pallets in accordance with the present invention, pallets are dispensed individually from a stack of pallets in a downstacker frame onto a conveyor belt passing beneath the frame, comprising the steps of positioning a lift unit beneath the frame, placing a stack of pallets on the lift unit, lifting or lowering the stack of pallets until the first pallet above a lowermost of the pallets in the stack is aligned with separation devices on the frame, advancing the separation devices into engagement with the next pallet, separating the lowermost pallet from the stack and placing it on the lift unit, lowering the lift unit until the lowermost pallet is placed on the conveyor belt and transferring away from the stack, raising the lift unit into engagement with the stack, retracting the separation devices and adjusting the lift unit until a next pallet above the lowermost pallet in the stack is aligned with the separation devices, and repeating the steps of advancing the separation devices, lowering the lift unit and transferring the lowermost pallet away from the stack until the stack of pallets is depleted. In carrying out the method of the invention, the lift unit is characterized by being placed between a pair of spaced conveyor belt runs which extend beneath the frame so that the lift unit can be lowered to deposit each pallet in succession from the lower end of the stack onto the conveyor belt run.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a side view in elevation of a preferred form of pallet dispensing apparatus in accordance with the present invention;

FIG. 2 is a top plan view of the preferred form of pallet dispenser;

FIG. 3 is a front view in elevation of the preferred form of apparatus;

FIG. 4 is a fragmentary, perspective view of a preferred form of pallet control mechanism in the non-engaged position;

FIG. 5 is a perspective view similar to FIG. 4 but illustrating the pallet control mechanism in the engaged position;

FIG. 6 is a perspective view of the pallet control mechanism shown in the engaged position with respect to a stack of pallets;

FIG. 7 is a perspective view from the underside of the apparatus illustrating release of a pallet from the stack and with the pallet control mechanism being shown in the engaged position; and FIG. 8 is a perspective view of the pallet control mechanism shown in the non-engaged position with respect to a stack of pallets.

DETAILED DESCRIPTION OF PREFERRED EMBODIMENT

Referring in detail to the drawings, there is illustrated in FIGS. 1 to 8 a preferred form of dispensing apparatus 10 which is broadly comprised of a table or base 12 supporting a pair of laterally spaced conveyor belts 14 beneath a downstacker frame 16, the frame being mounted on the table 12 to receive a series of pallets P arranged in a stack as broadly designated at S. As best seen from FIGS. 6 to 8, a scissors lift mechanism 18 is disposed between the conveyor belts 14 and beneath the frame 16 for lifting and lowering the stack of pallets P in relation to the downstacker frame 16. The downstacker frame 16 includes a pallet control mechanism 20 on opposite sides of the frame for selectively dispensing the pallets P individually from the lower end of the stack S onto the conveyor belts 14 in a manner to be hereinafter described. In the preferred form, the dispensing apparatus 10 will be described specifically in relation to the handling of molded pallets which can be nested together, each pallet including an upper tray portion T of flat rectangular configuration provided with generally cup-shaped pockets C at uniformly spaced intervals and in downwardly extending relation to each tray. The pallets as illustrated and described are given more as a setting for the present invention and by way of illustrative example of various pallets or articles that may be handled by the dispensing apparatus 10 of the present invention. However, an important consideration in the handling of the pallets P is that the pockets C when in nested relation tend to become wedged firmly together and require a positive separation force in releasing each individual pallet from the stack.

An important feature of the present invention resides in the pallet control mechanisms 20 and their cooperation with the lift 18 in dispensing the pallets P. As shown in FIGS. 1 to 3, the downstacker frame 16 includes cross braces 22 disposed transversely of the length of the conveyor belts 14 and in spaced parallel relation to one another, each brace 22 permanently affixed at opposite ends to upstanding beams 24 which extend upwardly from the table 12. A guide plate 25 is spaced inwardly from each wall panel 22 by spacers 26, and each guide plate 25 is mounted at one end to one of the beams 24 so that the guide plates are disposed in spaced confronting relation to one another and define a vertical space or guideway therebetween for movement of the pallet stack S. A brace 28 extends between the beams 24 parallel to the conveyor belts 14 and is provided with an inner spaced guide plate 29 mounted on spacers 30 so as to cooperate with the guide plates 25 in defining the common guideway for the pallet stacks. The side opposite to the wall panel 28 is left open to permit access to the guideway by an operator and to permit viewing of the dispensing operation.

Each of the pallet control mechanisms 20 is mounted behind one of the guide plates 25 and, as best seen from FIGS. 4 and 5, comprises a hanger rod 32 extending horizontally between mounting plates 33 which are permanently affixed to the beams 24, and the rod 32 supports pairs of outer pivot links 34 and inner pivot links 35 for downward extension and connection to a separation plate 36. A bracket 38 extends rearwardly from the mounting plates 33 and includes a horizontal bar 40 extending between opposite ends of the bracket and having a base plate 41 which supports a cylinder 42 for forward, horizontal extension toward the separation plate 36. A cylinder 44 is carried entirely by the plate 36 in closely spaced relation to the cylinder 42. The cylinder 42 includes a plunger or piston 45 pivotally connected as at 46 between the pivot links 35, and proximity switches 47 sense the position of the separation plate 36. In turn, the cylinder 44 has a plunger 48 terminating in a bifurcated end 50 for pivotal attachment of an arm 52. A follower arm 54 extends upwardly from each bifurcated end 50 and moves across the path of proximity switches 53 to permit sensing of the disposition of separation fingers 56 to be described.

Each of the separation plates 36 is of generally rectangular configuration and elongated in a direction transversely of or across the conveyor belts 14 with the link arms 34 and 35 mounted along the rearward edge of the plate 36, and a pair of separation tabs or fingers 56 are mounted in recesses 57 in the forward edge of the plate 36. The separation fingers 56 on each plate 36 are of generally rectangular configuration and have their rearward edges affixed to a common pivot shaft 58, as shown in FIG. 7, which is journaled beneath the plate 36 for pivotal movement of the fingers 56 between a retracted position flush with the plate 36 and a downwardly inclined or extended position, as shown in FIGS. 4 and 5, respectively. Pivotal movement of the separation fingers 56 is controlled by the cylinder 44 and the downwardly extending link member 52 which is affixed to the upper surface of one of the fingers 56 so that forward movement of the plunger 48 will cause the fingers 56 on each plate 36 to swing downwardly about the common pivot shaft 58, and retraction of the plunger 48 will cause upward swinging movement of the fingers 56 into the retracted or flush position as illustrated in FIG. 4. The cylinder 42 controls pivotal movement of the plate 36 about the hanger rod 32 through an opening 59 in the guide wall panel 25 into and away from the path of movement of the pallet stack S.

For the purpose of illustration but not limitation, the cylinders 42 and 44 are pneumatic cylinders, the piston 45 for the separation plate having a stroke of approximately 1½" and the plunger 48 for the retraction fingers 56 having a stroke on the order of 1". A locking pin 60 is movable through an opening in the inner link arms 35 under the control of a cylinder 62 for the purpose of locking each separation plate 36 in the extended position in the path of movement of the pallets P. In this way, in the event that there should be a failure in the pneumatic system, the separation plates 36 will remain in the extended position to support the stack. Preferably, the cylinders 42, 44 and 60 are double-acting cylinders and require positive air pressure for movement in either direction.

The lift mechanism 18 may be of standard construction and, for example, one such commercially available mechanism is a Model LS2-24 BACKSAVER LIFT, manufactured and sold by Southworth Products Corp. of Portland, Me. The lift mechanism 18 includes an upper support frame 64 provided with spaced tines or ribs 65 which will fit between the portion C on the undersurface of each pallet, and the support frame is mounted on a scissors drive unit 66 for lifting and lowering the support frame 64 and stack S with respect to the downstacker frame 16. Preferably, the lift mechanism 18 is of a size such that it can be lowered through the guideways of the downstacker frame 16 and between the conveyor belts 14 so as to rest on the floor surface with the support frame 64 even with or slightly above the conveyor belts 14.

The table 12 is of conventional open frame construction having legs 68 and upper horizontal frame members 70 extending parallel to the conveyor belts, and cross brace members 72 extend between the legs and beneath the conveyor belt 14. The conveyor belts 14 are preferably constructed of a belting material, e.g., a flat wire belt. The belts 14 are spaced apart for a distance greater than the width or length of the upper support frame 64 of the lift mechanism 18 but less than the transverse dimension of the pallets so that at least the outer peripheral edges of the pallet trays will support outer rows of the pockets C of each pallet. A drive motor 74 at one end of the table 12 is coupled to a common drive roller 75 for the spaced conveyor belts 14, and a follower roller 76 is disposed at the opposite end of the table.

In operation, the lift mechanism 18 is lowered through the guideway of the downstacker frame 16 so as to rest on the floor with the ribs 65 on its upper surface 64 extending parallel to the conveyor belts 14. A stack S of pallets is then lowered through the guideway of the frame 16 until it rests on the upper support frame 64 of the lift mechanism 18. As shown in FIG. 4, the separation plates 36 are fully retracted with the fingers 56 in the home or flush position with respect to the plates 36 and the locking pin 60 disengaged. The stack S is raised above the separation plates 36 by the lift mechanism 18 and is then lowered to a separation position in which the lowermost pallet P is disposed beneath the separation plates 36. The separation plates 36 are then activated to pivot or swing inwardly about their hanger rods 32 until they are aligned directly beneath the outer peripheral edges of the tray portion T of the second lowermost pallet P. The fingers 56 remain in the home position, for example, as shown in FIG. 6, and the locking pin 60 is extended. The lift mechanism 18 is then lowered away from engagement with the lowermost pallet P, and the separation fingers 56 are activated by the cylinder 44 to pivot downwardly into engagement with the lowermost pallet P thereby forcing the pallet downwardly away from the stack S until it is released and free to drop onto the upper surface 64 of the lift mechanism 18, as shown in FIG. 7. FIG. 5 illustrates the relationship of the fingers 56 to the plates 36 in the dispensing or separation position shown in FIG. 7. The conveyor belts 14 will then advance the released pallet P away from the downstacker frame area for transfer to another location or site for further handling.

To perform the next dispensing operation, the lift mechanism 18 is raised into engagement with the lowermost pallet P of the stack S and with the ribs 65 aligned to engage the underside of the tray portion T between the pockets C. The separation plates 36 are retracted so as to assume the relationship illustrated in FIG. 8, and the stack S is then lowered by the lift mechanism 18 to place the lowermost pallet P beneath the separation plates 36.

The dispensing operation is repeated until the pallet stack is empty, following which a new stack of pallets may be placed in the frame 16 as described. The locking pin 60 is activated in response to a signal generated by the photodiodes 47 when the separation plates 36 are returned to their retracted position and by the switches 53 when the separation fingers 36 return to their home position. As noted earlier, the locking pin 60 engages the inner pivot arm 35 when the plates 36 are in their extended position to prevent accidental movement of the separation plates 36 away from the path of movement of the stack S in the event that the pneumatic control system should fail. Accordingly, in order to drive the plates 36 away from the extended position, it is necessary to activate the locking pin cylinders to release the locking pins 60 from engagement with the links 35 as a preliminary to activation of the separation plate cylinders 42.

It will be evident that the apparatus of the present invention lends itself well to restacking pallets in the downstacker frame by effectively reversing the sequence described in connection with the dispensing of pallets. Conventional pneumatic and electrical control circuitry are employed to coordinate the movement of the separation plates 36 and fingers 56 in relation to the lift mechanism. It will be apparent that hydraulic cylinders or solenoids may be employed in place of the pneumatic cylinders 42 and 44; also that the plates 36 may be slidably extended and retracted through the same lateral path of movement as when pivotally mounted.

It is therefore to be understood that while a preferred form of method and apparatus for dispensing pallets is herein set forth and described, various modifications and changes may be made therein without departing from the spirit and scope of the present invention as defined by the appended claims and reasonable equivalents thereof.

I claim:

1. Apparatus for stacking and transferring flat stackable articles wherein each article has outer peripheral edges and a stack of said articles is disposed in a downstacker frame in an elevated position above a floor surface, the combination comprising:

laterally spaced conveyor belt runs extending beneath said downstacker frame;

lift means interposed between said conveyor belt runs for lifting and lowering said stack of articles with respect to said downstacker frame;

drive means for selectively driving said conveyor belt runs in a common direction with respect to one another; and article control means associated with said downstacker frame for individually dispensing a lowermost one of said articles in said stack onto said conveyor belt runs.

2. Apparatus according to claim 1, wherein said lift means is portable and supported on the floor surface independently of said downstacker frame.

3. Apparatus according to claim 1, wherein said article control means includes support means on said downstacker frame engageable with said stack of articles above a lowermost one of said articles in said stack.

4. Apparatus according to claim 3, wherein said article control means includes separation means engageable with said lowermost one of said articles to displace said lowermost one of said articles from said stack when said stack is supported by said support means.

5. Apparatus according to claim 3, wherein said support means includes support plates on opposite sides of said downstacker frame, suspension means for mounting said support plates in pivotal relation to said downstacker frame and means for advancing and retracting said support plates with respect to said stack of articles.

6. Apparatus according to claim 5, wherein said separation means is defined by pusher fingers on said support plates, and activating means for advancing and retracting said fingers with respect to said lowermost one of said articles.

7. An apparatus for dispensing nestable pallets wherein each pallet has outer peripheral edges and a stack of said pallets are nested together in a downstacker frame in an elevated position above a floor surface, the combination comprising:

a pair of laterally spaced conveyor belts extending beneath said frame;

drive means for selectively driving said conveyor belts in a common direction with respect to one another; and pallet control means associated with said downstacker frame for individually dispensing a lowermost one of said pallets in said stack onto said conveyor belts, said pallet control means including support means on said downstack frame engageable with opposite surfaces of said outer peripheral edges of said pallets, lift means between said conveyor belts for lifting and lowering said stack of pallets with respect to said downstacker frame, said lift means being movable to align a next pallet above said lowermost pallet in said stack with said support means, and said support means including separation means engageable with said lowermost pallet to displace said lowermost pallet from said stack when said stack is supported by said support means above said lowermost pallet 8. Apparatus according to claim 7, wherein said support means includes support plates pivotally mounted on opposite sides of said frame, and activating means for advancing and retracting said support plates into and out of engagement with said stack of pallets.

9. Apparatus according to claim 8, wherein said frame includes guide walls on opposite sides thereof, and said support plates are movable through openings in said guide walls into and out of engagement with said stack.

10. Apparatus according to claim 8, wherein said separation means is defined by fingers pivotally mounted on said support means.

11. Apparatus according to claim 10, wherein said fingers are disposed along leading edges of said support plates, first fluid-actuated cylinder means for advancing said support plates, and second fluid-actuated cylinder means for pivoting said fingers with respect to said support plates.

12. Apparatus according to claim 8, wherein said conveyor belts extend beneath said frame, and said lift means are movable in a vertical direction between said conveyor belts.

13. Apparatus according to claim 12, wherein said lift means cooperates with said support plates in individually dispensing each said lowermost pallet in succession onto said conveyor belts.

14. A method for dispensing pallets individually from a stack of pallets in a downstacker frame onto a conveyor belt passing beneath said frame, the method comprising the steps of:

(a) positioning a lift unit beneath said frame between laterally spaced runs of said conveyor belt;

(b) placing a stack of pallets on said lift unit;

(c) adjusting said stack of pallets until a next pallet above a lowermost one of said pallets in said stack is aligned with separation devices on said frame;

(d) advancing said separation devices into engagement with said next pallet;

(e) separating said lowermost pallet from said stack and placing said lowermost pallet on said lift unit;

(f) lowering said lift unit until said lowermost pallet is deposited on said conveyor belt;

(g) transferring said lowermost pallet on said conveyor belt away from said stack;

(h) raising said lift unit into engagement with said stack of pallets, retracting said separation devices and adjusting said lift unit until a next pallet above a lowermost of said pallets in said stack is aligned with said separation devices; and (i) repeating steps (d) to (h) until said stack is depleted.

15. The method according to claim 14, including the step of pushing said lowermost of said pallets downwardly away from said stack in step (e) above.

16. Apparatus for stacking and transferring flat stackable articles wherein each article has outer peripheral edges and a stack of said articles is disposed in a downstacker frame in an elevated position above a floor surface, the combination comprising:

laterally spaced conveyor belt runs extending beneath said downstacker frame;

drive means for selectively driving said conveyor belt runs in a common direction with respect to one another; and article control means associated with said downstacker frame for individually dispensing a lowermost one of said articles in said stack onto said conveyor belt runs, said article control means including support means on said downstacker frame engageable with said stack of articles above a lowermost one of said articles in said stack, said support means including support plates on opposite sides of said downstacker frame, suspension means for mounting said support plates in pivotal relation to said downstacker frame and means for advancing and retracting said support plates with respect to said stack of articles, and pusher fingers on said support plates including activating means for advancing and retracting said fingers with respect to said lowermost one of said articles in order to displace said lowermost one of said articles from said stack when said stack is supported by said support means.

17. Apparatus according to claim 16, wherein said fingers are disposed in pivotal relation to said support means.

18. Apparatus according to claim 17, wherein said fingers are disposed along leading edges of said support plates, and means for mounting said fingers in pivotal relation to said support plates for downward pivotal movement into engagement with said lowermost one of said articles.

* * * * *